June 12, 1951 L. W. HILLS 2,556,920
CONVEYER
Filed May 14, 1945 3 Sheets-Sheet 1
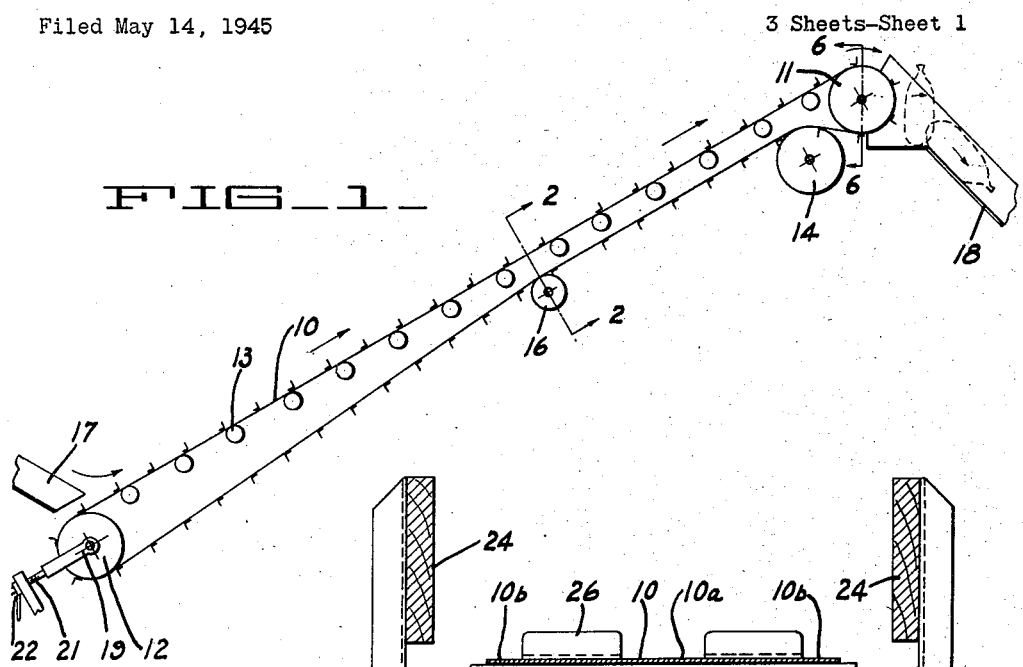
FIG_1_
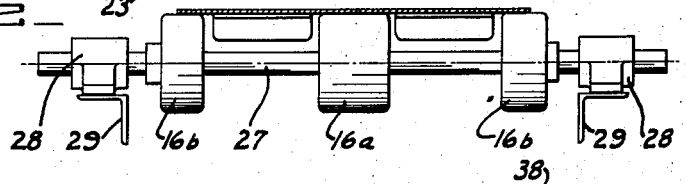
FIG_2_
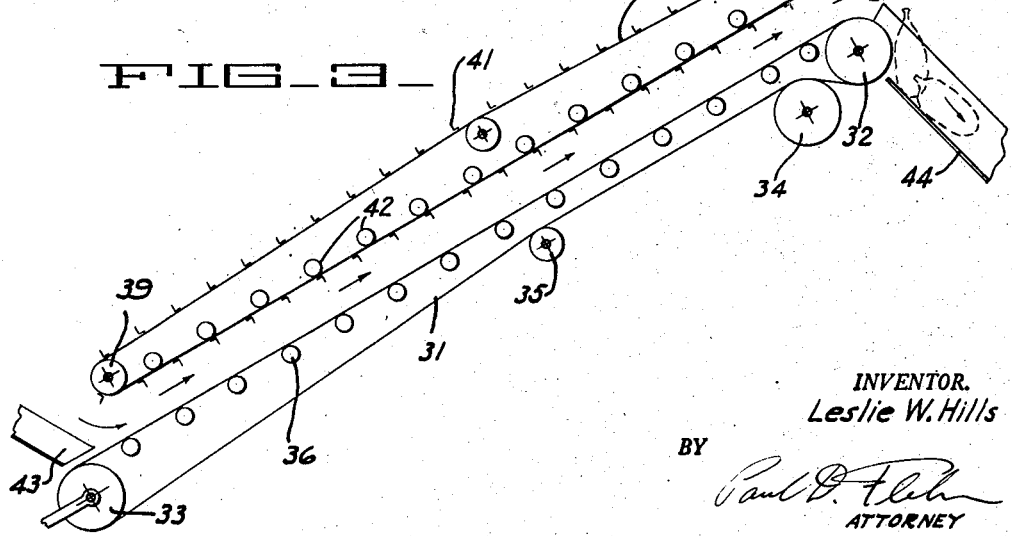
FIG_3_
INVENTOR.
Leslie W. Hills
BY
ATTORNEY

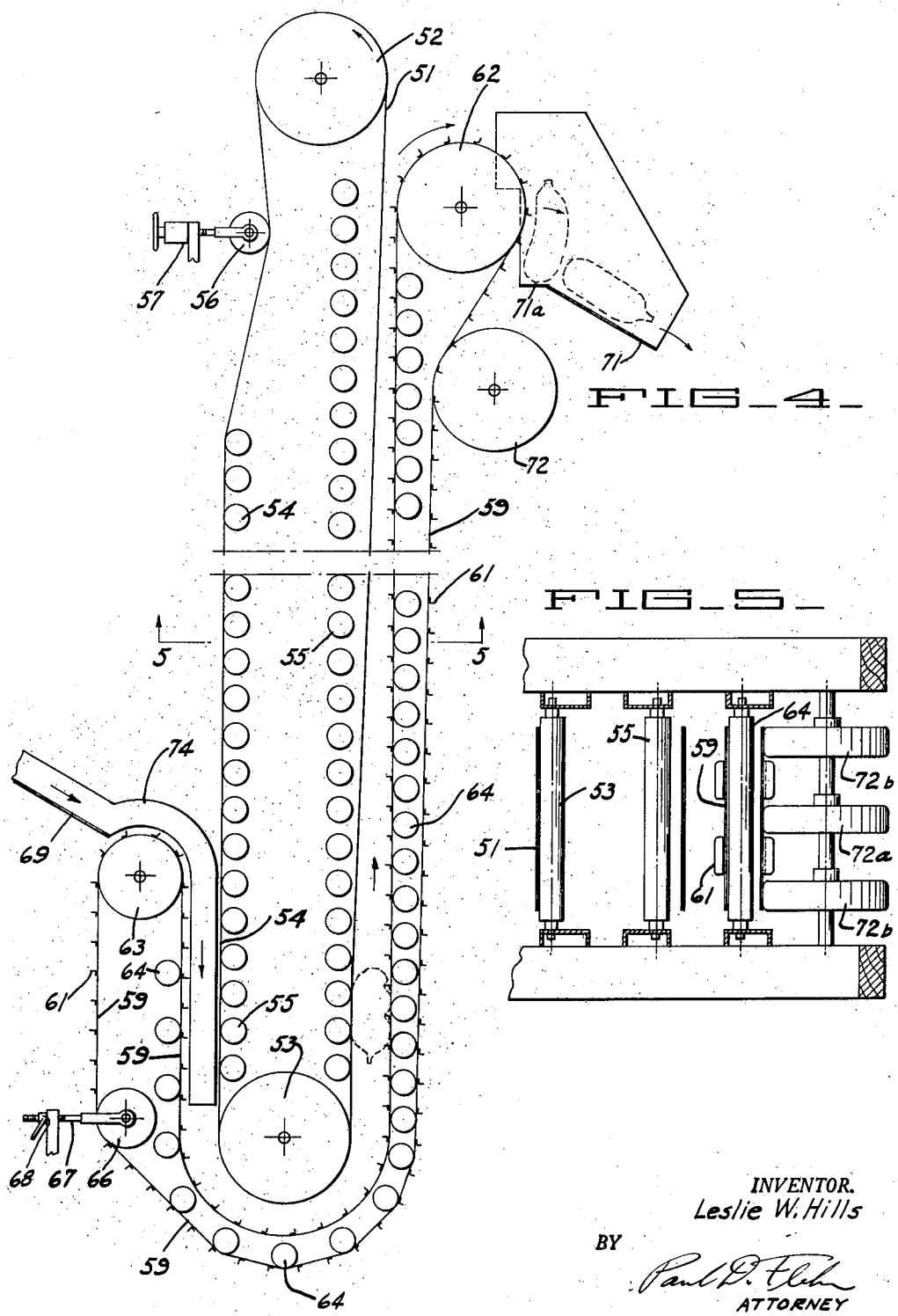

June 12, 1951  L. W. HILLS  2,556,920
CONVEYER
Filed May 14, 1945  3 Sheets-Sheet 3
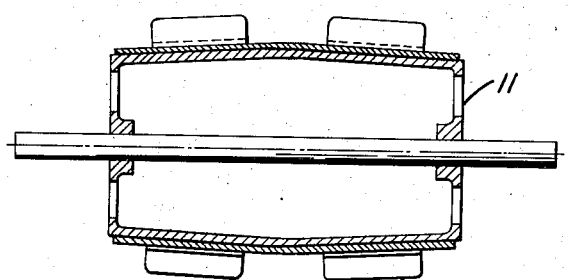
FIG_6_
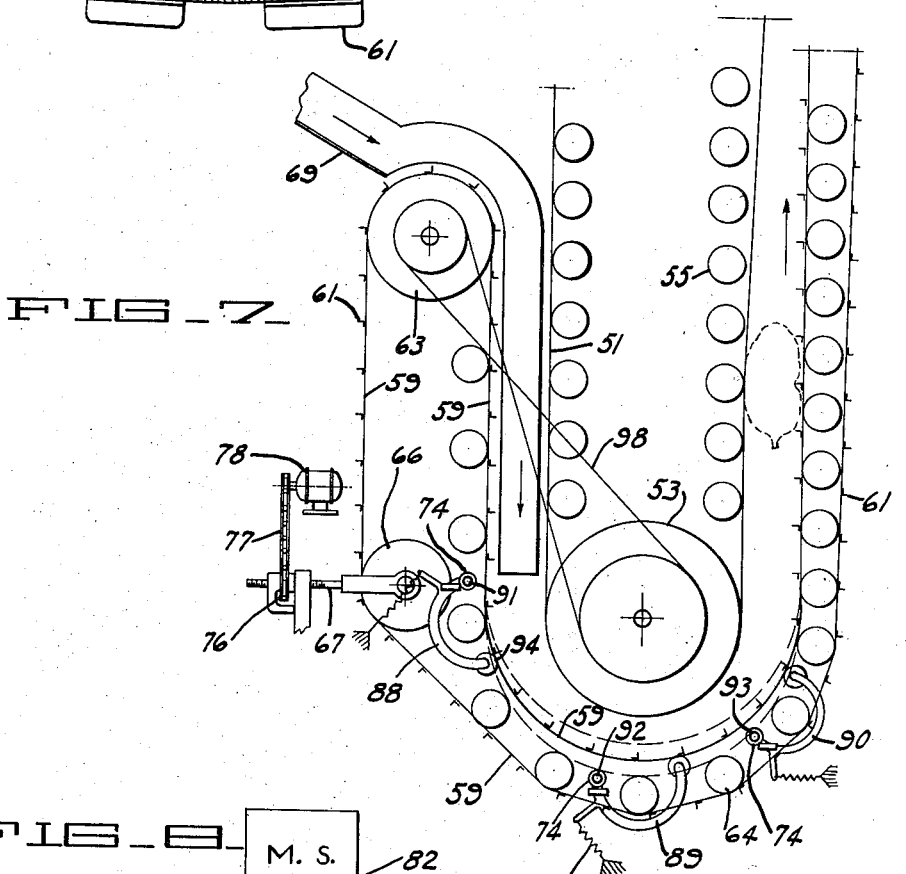
FIG_7_
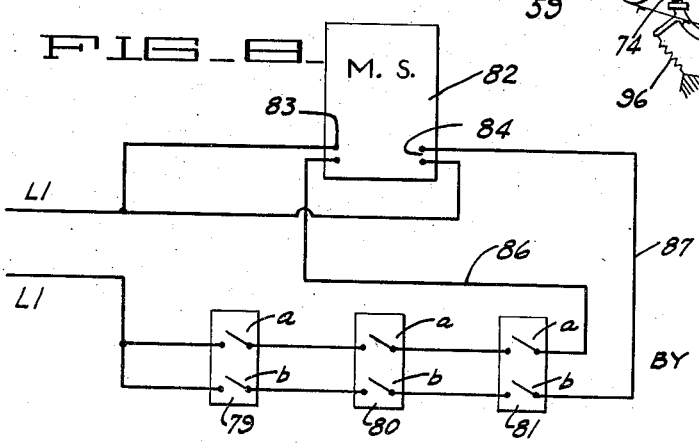
FIG_8_
INVENTOR
Leslie W. Hills
BY
Paul D. Flehr
ATTORNEY Patented June 12, 1951

2,556,920

UNITED STATES PATENT OFFICE 2,556,920

CONVEYER

Leslie W. Hills, San Francisco, Calif., assignor to Hills Bros. Coffee, Inc., San Francisco, Calif., a corporation of California Application May 14, 1945, Serial No. 593,675

7 Claims. (Cl. 198—198)

This invention relates generally to conveying apparatus of the type utilizing one or more endless conveying belts.

It is a general object of the invention to improve upon conveying apparatus of the type in which one or more of the conveying belts are provided with article engaging cleats. The present invention makes possible use of a relatively wide cleat carrying conveying belt operating upon one or more crowned pulleys.

A further object of the invention is to provide conveying apparatus of the above character having provision in conjunction with article carrying cleats for engaging or supporting the return run of the conveyor.

Another object of the invention is to provide a novel type of cleated conveyor belt which facilitates retention of articles such as bags.

A further object of the invention is to provide a cleated conveyor for handling various articles which is capable of elevating the articles at varying slopes or even in a vertical direction.

Additional objects of the invention will appear from the following description in which the preferred embodiments have been set forth in detail in conjunction with the accompanying drawing.

Referring to the drawing:

Figure 1 is a side elevational view diagrammatically illustrating conveying apparatus incorporating the present invention.

Figure 2 is an enlarged cross-sectional detail taken along the line 2—2 of Figure 1, but showing added details of construction.

Figure 3 is a side elevational view showing another embodiment of the invention incorporating two conveyor belts, one being cleated and the other smooth surfaced.

Figure 4 is a side elevational view diagrammatically illustrating another embodiment of the invention in which articles like bags are elevated to a point of discharge.

Figure 5 is a cross-sectional view taken along the line 5—5 of Figure 4, and showing added details of construction.

Figure 6 is a cross-sectional detail on an enlarged scale taken along the line 6—6 of Figure 1.

Figure 7 is a side elevational detail showing a modification of the conveyor shown in Figure 4 to include automatic electrical control mechanism.

Figure 8 is a circuit diagram for the electrical parts associated with the mechanism of Figure 7.

The invention illustrated in Figure 1 of the drawing consists generally of an endless conveyor belt 10 formed of suitable flexible material such as fabric-reinforced rubber or leather. The top run of the belt is shown supported by a series of rolls 13, and the lower or return run is engaged by the wrap pulley 14 and the support roll 16. The number of support rolls 16 required is dependent upon the length of the belt. With relatively short belts such rolls may be omitted in entirety, and it may also be possible to omit the wrap pulley 14. Suitable conveying means such as a chute 17 is shown for delivering articles such as bags to the lower part of the conveyor, and a second means in the form of a chute 18 is shown for receiving the bags or like articles being discharged over the head pulley 11. Tail pulley 12 may be journaled in an adjustable means for the purpose of taking up slack in the belt. The adjusting means shown schematically consists of bearings 19 attached to a threaded rod 21, the position of which can be adjusted by turning nut 22.

As shown in less diagrammatic Figure 2, rolls 13 can be journaled in the side angles or rails 23 of a supporting frame. The frame is also shown supporting the side guide rails 24.

The outer face of the belt 10 is provided with article engaging cleats 26 which are suitably attached to the flexible material of the belt, as by riveting or bolting. In place of extending these cleats across the width of the belt, which would be conventional practice, they are arranged in two rows spaced apart to form an intervening gap, and also spaced from the edges of the belt. Thus the central strip 10a of the belt is left unobstructed, and also there are unobstructed marginal edge portions 10b along the outer ends of the cleats. Various materials can be used for the cleats 26, but generally it is desirable that they be made of rigid material such as metal. It is desirable to have the corners of the cleats rounded as illustrated in Figure 2.

The return support roller 16 (see Figure 2) is of skeleton construction, or in other words it is made in three portions 16a and 16b, mounted upon a common shaft 27. This shaft is shown carried by journal blocks 28, which in turn are shown mounted upon the extended frame member 29. The dimensioning of roller portion 16a is such that a substantial clearance normally exists between the edges of its rim and the adjacent ends of the cleats 26. Likewise it is desirable that the edges of the rim be rounded off as illustrated. The edges of pulley portion 16b are likewise preferably rounded off as illustrated, and the proportioning is such that normally there is substantial clearance with respect to the adjacent ends of cleats 26. The journaling of shaft 27 in journal blocks 28 preferably permits some freedom of axial movement in response to lateral swing or sway of the return run of the belt. The rounded corners of the cleats and of the edges of pulley portions 16a and 16b permits aligning action of the pulley portions by actual contact with the end faces of the cleats.

Wrap pulley 14 is likewise skeletonized in the same maner as pulley 16. In other words here again three pulley portions are provided, a central portion for engaging the unobstructed central portion 10a of the conveyor belt, and two side pulley portions for engaging the edge margins 10b of the belt.

The periphery of the head pulley 11 is preferably provided with a substantial crown. While the manner of forming the crown may vary in practice, it is desirable that it be formed by having a central substantially cylindrical portion conforming generally to the central unobstructed portion 10a of the belt, and side portions extending to the ends of the pulley tapered to form truncated cones. As is known to those familiar with the operation of conveyor belts, the crowning of a head pulley facilitates proper tracking of the belt without resort to special means engaging the edges of the belt for aligning or centralizing the same. It is desirable that the tail pulley 12 be crowned in the same manner as the head pulley 11.

In operating the conveying apparatus described above the head pulley 11 is driven from some suitable source of power. Articles to be conveyed such as bags are delivered to the lower part of the conveyor from the chute 17. The bags are carried upwardly and as they pass over the head pulley 11 they are caused to be turned over for discharge down the chute 18. The arrangement of cleats in a plurality of spaced rows makes possible flexing over the crowned head pulley 11, without breaking or stressing the attachment between these cleats and the flexible material of the belt. This effect can be obtained with belts of substantial width which if equipped with the usual cleats extending completely across the belt, would be impractical with crowned pulleys because the belt would be lifted off contact with the pulley crown, risking pulling the heads of the cleat bolts through the belt, and causing at the same time a loss in traction upon the pulley surface.

The arrangement of cleats in spaced rows also makes possible the use of skeleton wrap pulleys and return rolls, which are capable of supporting a relatively wide cleated belt upon its cleat side. If the cleats were not arranged in rows spaced apart, then it would be necessary to attempt support of the belt on its cleat side by rollers or pulleys engaging only the edges of the belt. It will be evident that such support would be impractical with a belt of substantial width and weight.

In addition to the above the arrangement of the cleats in spaced rows is particularly desirable in the handling of articles such as bags, because the space between the cleats forms in effect a central groove which tends to prevent lateral displacement of bags resting upon the cleats.

In the embodiment of Figure 3 two endless belts are employed, one with and the other without cleats. The smooth surfaced belt 31 engages the head and tail pulleys 32 and 33, and the lower run is shown engaged by the conventional wrap pulley 34 and support roll 35. The upper run of the belt is also shown supported by a series of rolls 36.

A second endless belt 37 is provided above the first belt and has its end loops engaging the head and tail pulleys 38 and 39. Cleats 41 are carried by this belt and are arranged in two or more rows in the same manner as cleats 26 in Figures 1 and 2. A series of support rolls 42 are provided for engaging the inner side of the lower run of the belt, when the lower run is pressed upwardly by engagement with a bag or like article being conveyed. Chutes 43 and 44 are shown for delivering articles to the belt 31, and for removing articles delivered over the head pulley 32.

Operation of the embodiment shown in Figure 3 is as follows: Preferably both the pulleys 32 and 38 are driven to drive the two belts at substantially the same speed. When an article such as a bag is delivered to the lower end of the smooth surfaced conveyor 31, it is engaged by the cleats on the upper belt and is thereby carried upwardly and finally discharged over the head pulley 32. In discharging over this head pulley the bag is caused to fall over in the manner illustrated in dotted lines.

The embodiment of Figures 4 and 5 likewise uses smooth and cleated conveyor belts, and these belts are arranged to elevate bags or like articles in a vertical direction. The smooth surfaced belt 51 has its upper loop engaging the crowned head pulley 52, and its lower end engaging the tail pulley 53. The left hand run of this belt is shown engaging the support rolls 54, and a similar series of rolls 55 is provided for the right hand run. For a purpose to be presently explained it is desirable that the center of pulley 52 be translated somewhat to the right of the vertical center line of pulley 53, and with the rolls 55 positioned in such a manner that when the belt 51 is substantially taut, without engagement with articles, it diverges from contact with the rolls 55 as shown in Figure 4. A take-up pulley 56 is shown engaging the left hand run of the belt near the crowned pulley 52, and can be provided with suitable adjustable take-up means 57.

Belt 59 is provided with cleats 61 arranged in a plurality of spaced rows substantially in the same manner as described with reference to Figures 1 and 2. The upper loop of belt 59 engages the head pulley 62, which is crowned in the manner previously described, and both runs of the belt are looped beneath the pulley 53. At a point somewhat above the pulley 53 the end loop of belt 59 engages the pulley 63.

A series of support rolls 64 are provided for engaging the left hand run of belt 59, and this series of rolls is extended beneath the pulley 53 and upwardly toward the pulley 63. A suitable take-up pulley 66 engages the outer run of belt 59 at a suitable point, such as below the pulley 63, and this pulley is connected to suitable means for adjusting its position, such as the threaded rod 67 and adjustable nut 68. It is desirable in many instances that this adjustment be automatic in a manner to be presently explained.

Suitable means such as a chute 69 is shown for delivering bags or like articles upon the pulley 63. Likewise suitable means such as chute 71 is shown for receiving bags being delivered over the head pulley 62, and this chute is provided with a bag receiving platform 71a. Below the head pulley 62 belt 59 is engaged by the wrap pulley 72, which is preferably skeletonized to provide pulley portion 72a and 72b as shown in Figure 5. Pulley portion 72a engages the area of the belt between the cleats 61, while pulley portion 72b engages the side margins of the belt. Side guide plates 74 are shown carried by chute 69 and extending downwardly from pulley 63 between the adjacent opposed vertical portions of belts 51, 59. These plates can be spaced apart a distance approximating the width of the belts.

It is desirable to provide suitable drive connections to the head pulleys 52 and 62 whereby the belts 51 and 59 are driven at the same linear speeds. It is also desirable to drive pulley 63 from pulley 53, as by means of a cross belt. In this connection it is desirable that the drive to pulley 63 be at a rate slightly greater than that corresponding to the linear speed of the belt 59. This serves to insure that the excess in belt length for belt 59 will be in that portion of this belt which is traveling downwardly from the pulley 63, whereby the loop in belt 59 formed below the pulley 53 approaches but does not come directly into contact with the adjacent rolls 64.

The embodiment of Figures 4 and 5 operates as follows: Bags are delivered from chute 69 to that part of the cleated belt passing over pulley 63. As the bag settles into the vertically extending space between belts 51 and 59, it is slightly squeezed, guided and aligned by contact with the side guide plates 74 and the contents of the bag tend to settle down toward the lower part of the bag to thereby cause a bulging or swelling to establish lateral pressure between the opposed belt surfaces. Thus because of such swelling the cleats 61 become operative to engage and restrain the bag from dropping. As the bags pass below the pulley 53 the lateral pressure is relieved both because the contents settle down in a direction away from belt 51, and because the space between the belts below pulley 53 is greater than for the vertical runs of the belts. However the bag continues to be carried by the cleats to the right of the center line of pulley 53 and as the bag starts upwardly there is again a settling of the contents with a bulging of the sides of the bag to reestablish lateral pressure between the belts. Thus the bag reestablishes gripping relation with the cleats 61 and is carried upwardly toward the head pulley 62. As the bag approaches pulley 62 the adjacent portion of the belt 51 is displaced to the left to contact the support rolls 55. As the bag reaches the pulley 62 the adjacent portion of belt 51 tends to push the upper portion of the bag over pulley 62, thus preventing the bag from standing straight upward or rolling back upon itself. Upon passing over the head pulley 62 the bag drops head first upon the substantially level platform 71a and then falls over into the chute 71 in the manner illustrated in dotted lines.

In actual practice the excess length of belt 59 will vary depending upon the load upon the belts. As the length of the belts increases the slack or excess length of belt 59 will vary over considerable limits. Figure 7 illustrates a suitable means for the purpose of adjusting the take up pulley 66 to automatically maintain the location of the belt loop below pulley 53 under different load conditions. Thus the threaded member 67 is shown having a nut 76 driven through chain 77 by a reversible electric motor 78. A suitable circuit for the motor is shown in Figure 8 and includes a plurality of controlling switches 79, 80 and 81, together with a motor starter 82 which connects with the motor 78. The terminals 83 and 84 of the motor starter connect to the windings of magnetic reversing switches whereby when current is applied to terminals 83 the motor 78 is operated in one direction, and when current is applied to the other terminals 84 the direction of rotation of the motor is reversed. One of each of the terminals 83, 84 is connected to the current supply line L—1. The other one of the terminals 83 is connected by conductor 86 to one side of the contacts a of switch 81. The contacts a of all switches 79, 80 and 81 are connected in series and the remote side of contacts a of switch 79 is connected with line L—1. Contacts b of switches 79, 80 and 81 are likewise connected in series between line L—1 and conductor 87 which leads to one of the terminals 84 of the motor starter.

Switches 79, 80 and 81 are arranged to be operated automatically in accordance with the position of the belt loop below the pulley 63. Thus as diagrammatically illustrated in Figure 7 each of these switches is of the Mercoid type operated by tilting movement. Arms 88, 89 and 90 are provided which are carried on pivot shafts 91, 92 and 93. The free ends of the arms carry rollers 94 which engage the outer surface of the adjacent belt 59 at spaced points as illustrated. Switches 79, 80 and 81 are mounted upon arms, 88, 89 and 90 near the axis of shafts 91, 92 and 93, whereby when the arms are moved clockwise or counterclockwise from their normal positions shown in solid lines, the contacts a and b are alternately opened and closed. Suitable means such as springs 96 serve to urge the arms in a counterclockwise direction to cause rollers 94 to be held in engagement with the conveyer belt.

In Figure 7 a crossed belt 98 forms a drive between pulleys 53 and 63, with the drive ratio being as previously described. Such a drive is capable of a small amount of continuous slippage.

For the position of the belt illustrated in solid lines in Figure 7 the switches assume a neutral position in which both contacts a and b of each switch are open. However when under load conditions the belt stretches to a position such as shown by the lower dotted line position each of the arms is rotated in a clockwise direction to cause the contacts b to be closed. This causes the motor 78 to be operated in a direction to take up the pulley 66 to thereby tighten the conveyor belt 59 and to restore the loop portion below pulley 53 to substantially the position shown in solid lines. Conversely should the belt 59, because of light load conditions, assume a position such as shown by the upper dotted lines, then contacts a of the switches 79, 80 and 81 are closed, with the result that the motor 78 is operated in a reverse direction to slacken upon the pulley 66, thus causing the belt to return to substantially normal position.

I claim:

1. In conveying apparatus, an endless flexible belt having one side of the same forming an article conveying surface, a plurality of article engaging cleats secured to the belt, said cleats extending generally laterally of the belt and being arranged in at least two rows, the rows extending longitudinally of the belt and being spaced apart to form a substantially unobstructed longitudinally extending flexible portion, said cleats also stopping short of the side margins of the belt whereby the side margins are likewise substantially unobstructed in a direction longitudinal of the belt, pulleys serving to track the end loops of the belt, at least one of said pulleys being crowned, and a skeletonized pulley engaging one run of the belt, said pulley having one portion of the same engaging the unobstructed portion of the belt between rows of cleats and having additional portions of the same engaging the side margins of the belts.

2. In conveying apparatus, first and second pulleys disposed at upper and lower elevations, an endless conveying belt having upper and lower end loops of the same engaging the upper and lower pulleys, a second endless conveying belt having a portion of the same extending in substantial parallel proximity with one upwardly extending run of the first belt and having a lower portion looped in spaced relationship below and about the lower loop of the first conveyor, means for presenting articles to the space between the belts at a region adjacent the lower pulley, and means for driving one of the belts in such a direction that articles presented to the belts are caused to be carried between the belts down and about the lower pulley and then elevated while retained between the belts.

3. In a conveying belt, first and second pulleys disposed at upper and lower elevations, an endless conveying belt having upper and lower end loops of the same engaging said pulleys, a second endless conveyor belt having a portion of the same extending in proximity with one upwardly extending run of the first belt and having a lower contiguous portion looped in spaced relation with the lower loop of the first conveyor, a third pulley at an elevation below the first pulley of the first conveyor belt and over which the upper portion of the second conveyor belt engages, a fourth pulley disposed adjacent the lower pulley but at an elevation above the same and on the side of the first belt opposite that on which said third pulley is disposed and over which the second conveyor belt is looped, and means for driving the belts, the direction of drive being such that articles placed upon the second belt as it passes over the fourth pulley are caused to be carried about the lower pulley between the belts, and then elevated while retained between the belts, and then delivered over the third named pulley in a direction away from the first conveyor belt.

4. In conveying apparatus, a first pulley disposed at an elevation with respect to a lower second pulley, an endless conveyor belt having end loops of the same engaging said pulleys, a second endless conveyor belt having a cleated exterior surface and having one run of the same disposed in substantial parallel proximity with one run of the first belt, backing means for both said runs serving to limit spreading of the same apart, said second belt being looped in spaced relation with the lower loop of the first conveyor, a third pulley disposed below the first pulley, and over which the upper portion of the second conveyor belt is looped, a fourth pulley disposed adjacent the second pulley but at an elevation above the same and on the side of the first belt opposite that on which said third pulley is disposed and over which said second belt is likewise looped, means for delivering articles to be conveyed upon the cleated surface of the second conveyor belt at the place at which it passes over said fourth pulley, and means for driving said belts in such a direction that articles depositing upon the second conveyor belt as it passes over the fourth pulley are carried downwardly and about the second pulley between the conveyor belts and then upwardly between the belts and finally delivered over the third pulley.

5. Conveying apparatus as in claim 4, together with electrical contacting means operated by that portion of the second conveyor which is looped in spaced relationship with the second pulley, and electrical motive means controlled by said contact means for maintaining the spacing between the second belt and the second pulley substantially constant.

6. In conveying apparatus, first and second pulleys disposed at upper and lower elevations, an endless conveying belt having upper and lower end loops of the same engaging the upper and lower pulleys, a second endless conveying belt having a portion of the same extending in substantial parallel proximity with one upwardly extending run of the first belt and having a lower portion looped substantially directly below and in spaced relationship with the lower loop of the first conveyor, means for presenting articles to the space between the belts at a region adjacent the lower pulley, means for driving one of the belts in such a direction that articles presented to the belts are caused to be carried between the belts and about the lower pulley and then elevated while retained between the belts, and means responsive to a change in spacing between the lower loop portion of the second conveyor belt and the second pulley serving to automatically adjust the slack of the second belt to thereby tend to maintain said spacing substantially constant.

7. In conveying apparatus, an endless flexible belt having one side of the same forming an article conveying surface, said belt having looped end portions, one of which is adjacent an article receiving station and another of which is adjacent an article discharge station, article engaging cleats secured to the belt and each extending laterally of the same, said cleats being arranged in at least two rows extending longitudinally of the belt, the rows being spaced apart in a direction laterally of the belt whereby they are separated by an unobstructed flexible portion of the belt extending longitudinally of the same, pulleys engaging said looped portions of the belt, and a roller or pulley arranged adjacent that end portion of the belt which is adjacent the discharge station and formed to engage said flexible portion on the cleat side of the same.

LESLIE W. HILLS.

REFERENCES CITED

The following references are of record in the file of this patent:

UNITED STATES PATENTS

| Number | Name | Date |
| --- | --- | --- |
| Re. 9,276 | Randolph | July 6, 1880 |
| 660,696 | Brackenbush | Oct. 30, 1900 |
| 890,292 | Monette | June 9, 1908 |
| 906,670 | Wise et al. | Dec. 15, 1908 |
| 999,419 | Van Wert | Aug. 1, 1911 |
| 1,422,398 | Wentz | July 11, 1922 |
| 2,077,000 | Miller | Apr. 13, 1937 |
| 2,223,704 | Powell | Dec. 3, 1940 |
| 2,241,219 | Plausics | May 6, 1941 |
| 2,254,116 | Cooper et al. | Aug. 26, 1941 |
| 2,257,351 | Silver | Sept. 30, 1941 |